United States Patent Office 3,524,040
Patented Aug. 11, 1970

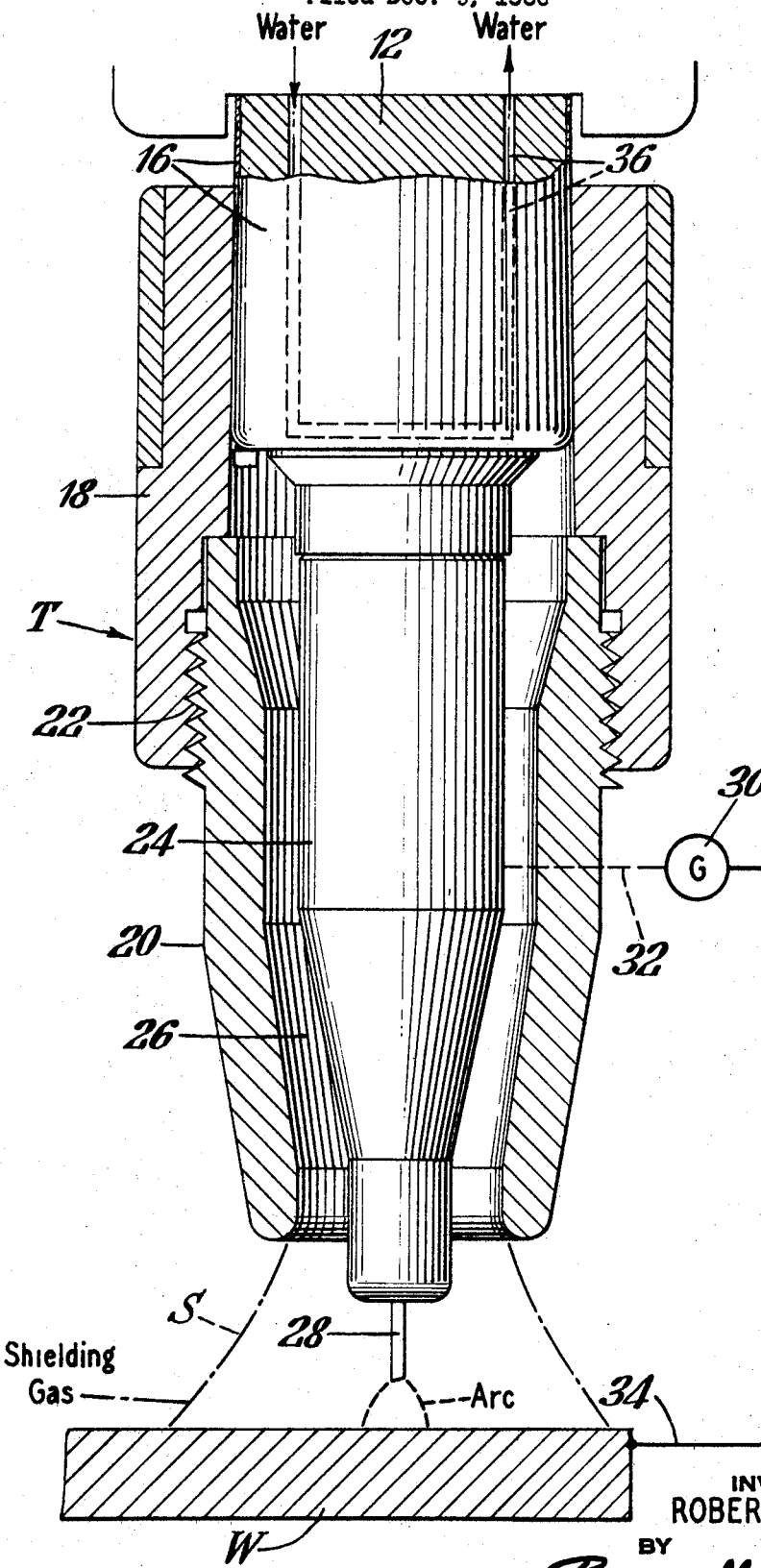

3,524,040
GAS SHIELDED ARC TORCH
Robert M. Gage, Summit, N.J., assignors to Union Carbide Corporation, a corporation of New York
Filed Dec. 9, 1966, Ser. No. 600,569
Int. Cl. B23k 9/00
U.S. Cl. 219—75     5 Claims

ABSTRACT OF THE DISCLOSURE

A gas shielded electric arc working torch comprising the combination of a torch body provided with a heat sink, a gas cup, and means connecting said gas cup to said heat sink comprising concentric members composed of heat conductive materials, at least one of said members being or provided with a dense but thin thermally conductive layer or coating of electrically insulating material, and the other member or members being intimately fitted thereto with such thin layer of coating physically connecting but electrically insulating said members.

---

This invention relates to electric arc working apparatus, and more particularly to gas-shielded arc torches.

The invention thus provides a gas shielded electric arc torch in which the gas cup composed of metal is electrically insulated from the body comprising a heat sink by novel means including a dense but very thin thermally conductive insulator which effectively conducts objectionable heat from the cup to the body. Thus, complicated, bulky and expensive plumbing, as shown for example in U.S. Pat. 3,261,962, issued July 19, 1966, for conducting cooling water, for example, to and from the cup is completely eliminated, while effectively keeping the cup, as well as the metal contact tip, relatively cool, i.e. below a temperature above which mechanical properties (cold working) occur. Another advantage over a prior art torch without complicated plumbing for example as illustrated in U.S. Pat. No. 2,952,766, is that the life of the cup and contact tip are substantially extended, because objectionable spatter is less adherent and easier to remove, and even tends to drop off.

In the drawing, the single figure is a view mainly in enlarged vertical section of one welding torch embodying the invention.

Such torch T comprises a water-cooled metal body or heat sink 12. The external surface of the heat sink body 12 is provided with a thin but dense coating 16 of electrically insulating material such as $Al_2O_3$. A tubular metal cup body adaptor 18 is pressure-fit to the body 12 with the coating 16 therebetween so that heat, but not electrical current, can flow through such coating 16 from the adaptor 18 to the heat sink body 12. A metal cup composed of copper alloy 20 is connected by threads 22 to the adaptor 18.

Depending from the body 12 is a copper alloy contact tip 24 which is concentrically spaced from the interior of the cup and adaptor to provide an annular passage 26 for the flow of gas or gas mixture downwardly and out of the torch T. A consumable electrode 28 passes through the center of torch T including contact tip 24 which conducts arc welding current thereto from a welding generator 30. The latter is connected by a positive lead 32, for example, to the torch body 12, and by a negative lead 34 to the work W to be welded.

In operation, electrode 28 is fed through the contact tip 24 toward the work W and a welding arc A is established between the end of such electrode 28 and the work W, as arc shielding gas S, such as argon, is discharged from the cup 20. As the cup 20 and adaptor 18 tend to heat up in use, heat is conducted therefrom through the coating 16 to the body heat sink, thus keeping the cup relatively cool in use. The coating 16 is preferably as dense as possible for strength as well as thermal conductivity, and preferably is applied by flame-spraying powdered $Al_2O_3$ on the surface of the body 12.

The body 12 is water-cooled in case considerable heat should be removed from the cup, and for even more efficient operation, baffled water cooling passages 36 are provided in the heat sink 12, extending as closely as possible to the lower extremity of such heat sink 12.

In considering a specific design embodying the principle of this invention, the thermal conductivities of suitable electrically insulating materials are typically only 0.03 to 0.0003 that of copper. The objective, when selecting the thickness of the thermally conductive layer is to make it as thin as practicable while maintaining electrical isolation between the torch body and gas cup in torch assembly and in use. Both plastic films and ceramic coatings as little is 0.001 in. thickness have proven feasible.

In the case of an $Al_2O_3$ layer, a 0.005 in. thickness is equivalent in heat conductivity to a copper thickness of perhaps ¼ in. Typically in a high current welding operation in which say 500 watts of heat energy must be conducted across the electrically insulating layer from the gas cup to the heat sink this results in a temperature drop across the insulation of less than 25 degs. F. for 1 sq. in. of $Al_2O_3$ coating, which for all practical heat conduction purposes is the same as if the whole connection were solid copper. An equivalent sized plastic film, a poor heat conductor even relative to $Al_2O_3$, would result in a temperature drop of perhaps 750 degs. F. which is not only near the upper thermal limit for plastic materials but also is an undesirably high temperature base for the gas cup. Obviously, when a plastic film is designed for use at high thermal fluxes, the area of the film must be increased and the thinner films must be employed. For example, 2 sq. in. of area and 0.001 in. thickness reduces the temperature drop to 75 degs. F., which is completely acceptable.

Therefore, depending on the heat conductivity of the layer of film material, it is sometimes desirable to restrict the thickness to as little as 0.001 in. Conversely, for the better heat conductors, the film or layer can be as much as 1 mm. thick without excessive temperature drop. However, there is no known useful purpose in designing a film greater than about 0.015 in. thick, and indeed the mechanical problems of design and assembly are merely aggravated. Therefore, the preferred range of thickness lies between 0.001 and 0.015 inch.

What is claimed is:
1. A gas shielded electric arc working torch comprising the combination of a torch body comprising a heat sink, a gas cup, and means connecting said gas cup to said heat sink comprising members composed of heat conductive material, at least one of said members comprising a dense thermally conductive layer of electrically insulating material having a thickness of between 0.001 and 0.015 inch, and another member being tightly fit thereto with such thin layer physically connecting but electrically insulating said members.

2. A gas shielded electric arc torch as defined by claim 1, in which means are provided for water-cooling said heat sink.

3. A gas shielded arc torch as defined by claim 1, in which said heat sink comprises a cylindrical projection of said body, said projection being provided with such layer, and a cup adaptor is tightly fitted to said projection on such layer.

4. A gas shielded arc torch as defined by claim 3, in which all of the parts except said layer are composed of copper alloy, and such layer is composed of flame-sprayed fine particles of $Al_2O_3$.

5. A gas shielded arc torch as defined by claim 1, in which a contact tip is connected to said body for the passage of an electrode therethrough, and means are provided for connecting said tip in an arc energizing circuit with work which is acted upon by an arc formed between the end of such electrode and the work.

References Cited

UNITED STATES PATENTS

| | | | |
|---|---|---|---|
| 3,121,154 | 2/1964 | Menzies et al. | 219—540 |
| 3,270,179 | 8/1966 | Russell | 219—74 |
| 3,398,231 | 8/1968 | Sullivan | 219—75 X |

JOSEPH V. TRUHE, Primary Examiner

C. L. ALBRITTON, Assistant Examiner

U.S. Cl. X.R.

219—130